(No Model.)

R. & J. BARLASS.
LANTERN HOLDER.

No. 439,620.  Patented Nov. 4, 1890.

Witnesses.  Inventors.

UNITED STATES PATENT OFFICE.

ROBERT BARLASS, OF HARMONY, AND JOHN BARLASS, OF JOHNSTOWN, WISCONSIN.

LANTERN-HOLDER.

SPECIFICATION forming part of Letters Patent No. 439,620, dated November 4, 1890.

Application filed January 16, 1890. Serial No. 337,032. (No model.)

*To all whom it may concern:*

Be it known that we, ROBERT BARLASS, of Harmony, and JOHN BARLASS, of Johnstown, the post-office address of both of whom is Janesville, all in the county of Rock and State of Wisconsin, have invented new and useful Improvements in Lantern-Holders; and we do hereby declare the following to be a full, clear, and exact description of said invention, reference being had to the accompanying drawings, and to the letters of reference marked thereon, which form a part of this specification.

In driving at night over country roads it is often desirable and sometimes necessary to have a light so attached to the vehicle as to throw its rays on the road in front of the team. For this purpose farmers sometimes use a lantern supported on the wagon, and a one-tined hook fixed in the front part of the box has been used for supporting the lantern; but that device is not satisfactory, as it permits the lantern to swing from side to side, and, in fact, in all directions when going over rough roads.

Our device consists in a peculiarly-formed and properly-constructed lantern-holder to be secured to the wagon or carriage box and on which the lantern may be conveniently hung and which will hold the lantern against lateral swing.

Figure 1:
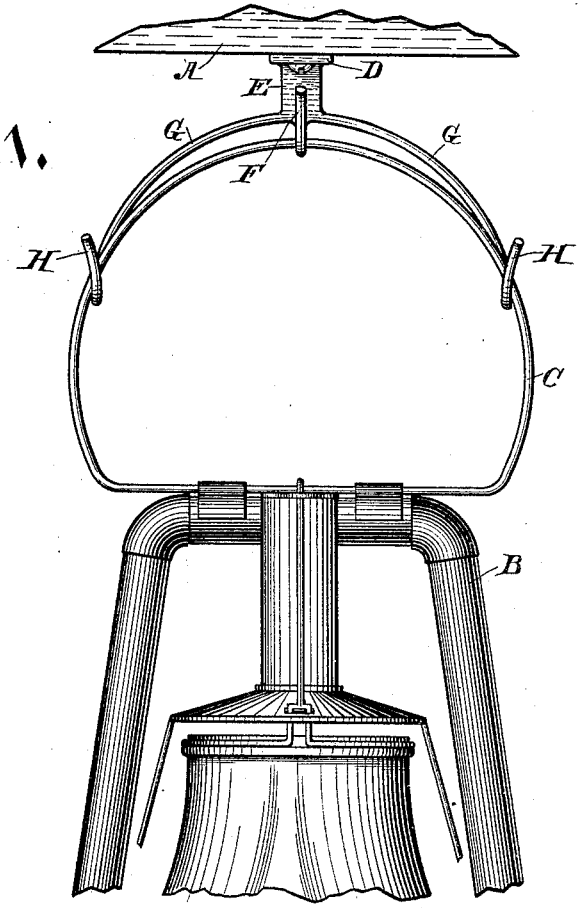
Figure 2:
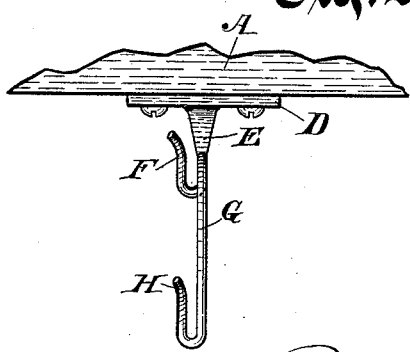

In the drawings, Figure 1 is a front view of our device secured to the under side of a wagon or carriage box in connection with so much of a lantern as is necessary to show the use of the device. Fig. 2 is an edge view of the device at right angles to Fig. 1.

A is the bottom board of the box of a wagon or carriage.

B is a lantern provided with a bail C.

Our improved lantern-holder, preferably constructed of metal, consists of a base-piece D, through which the device is secured permanently to the under side of the bottom board of the vehicle-box or any other convenient location. A downwardly-extending central shank E is provided with a central hook F, which is preferably constructed deep and narrow, so as to receive the bail C of the lantern therein and retain it except by removal of the lantern and bail by lifting them a considerable distance—a sufficient distance to raise the bail out of the deep hook F. Two arms G G extend laterally outwardly and downwardly—one in each direction—which arms terminate in upwardly and outwardly curved hooks H H, also adapted to receive therein the bail of the lantern. These hooks H H are also made deep, so that the bail will not escape therefrom except by being lifted out of them. These arms G G are so curved downwardly and outwardly as to conform to the shape of the bail of a lantern of the form in common use among farmers. By this form of a holder having three deep hooks located at a distance from each other and in proper position to conform with the shape of the bail of a lantern, a lantern hung thereon will be held against any independent swinging motion, and the bail will be held firmly in place against a swinging motion forward and back.

What we claim as new, and desire to secure by Letters Patent, is—

A lantern-holder consisting of a single shank provided with means for affixing it to and suspending it from the under side of a vehicle-box, a deep narrow central hook integral with the shank, two arms projecting laterally from the lower end of the shank opposite the central hook and curving downwardly therefrom, and two deep narrow hooks forming the termination of the laterally-extending arms, the three hooks being adapted to receive the curved bail of a lantern therein and support the lantern, holding it against lateral motion other than with the vehicle, substantially as described.

In testimony whereof we affix our signatures in presence of two witnesses.

ROBERT BARLASS.
JOHN BARLASS.

Witnesses:
JOHN CUNNINGHAM,
MAUDE YOUNG.